United States Patent [19]

Fergg et al.

[11] 4,128,330
[45] Dec. 5, 1978

[54] EVALUATION AND COPYING OF ORIGINALS ARRANGED IN A STRIP

[75] Inventors: Berthold Fergg, Taufkirchen; Friedrich Hujer, Grünwald; Wolfgang Zahn, Munich, all of Fed. Rep. of Germany

[73] Assignee: Agfa-Gevaert AG, Leverkusen, Fed. Rep. of Germany

[21] Appl. No.: 751,602

[22] Filed: Dec. 17, 1976

[30] Foreign Application Priority Data

Dec. 20, 1975 [DE] Fed. Rep. of Germany ....... 2557755

[51] Int. Cl.² .................... G03B 27/32; G03B 27/52
[52] U.S. Cl. .......................................... 355/32; 355/40
[58] Field of Search ............... 355/16, 18, 32, 29, 355/77, 88, 35, 41, 83, 38, 39, 40, 42

[56] References Cited

U.S. PATENT DOCUMENTS

| | | | |
|---|---|---|---|
| 3,220,301 | 11/1965 | Koonz et al. | 355/40 |
| 3,369,449 | 2/1968 | Klauss et al. | 355/18 |
| 3,473,451 | 10/1969 | Greenly et al. | 355/40 X |
| 3,516,741 | 6/1970 | Thaddey | 355/29 X |
| 3,709,601 | 1/1973 | Zahn et al. | 355/35 X |
| 3,898,002 | 8/1975 | Kinder et al. | 355/40 |
| 3,947,110 | 3/1976 | Yamada | 355/88 X |

FOREIGN PATENT DOCUMENTS

1533747  8/1967  France .................................... 355/40

*Primary Examiner*—Donald A. Griffin
*Attorney, Agent, or Firm*—Michael J. Striker

[57] ABSTRACT

The strip of originals to be copied is transported, prior to copying, through an evaluation station. There, the originals are evaluated with respect to density, color, copiability, or the like. A discrete strip-shaped information carrier is connected to the strip of originals and runs along the length of the strip of originals. The connection is effected either upstream of the evaluation station or at the evaluation station. Information derived from the evaluations performed at the evaluation station is entered upon the information carrier alongside the associated ones of the originals.

11 Claims, 4 Drawing Figures

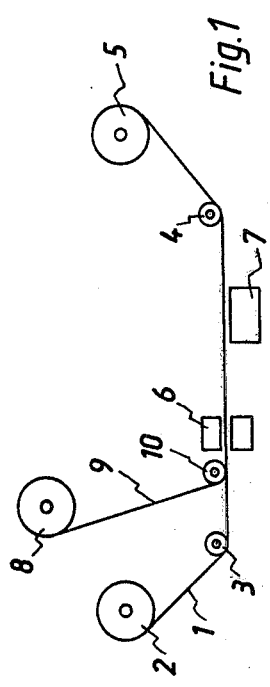
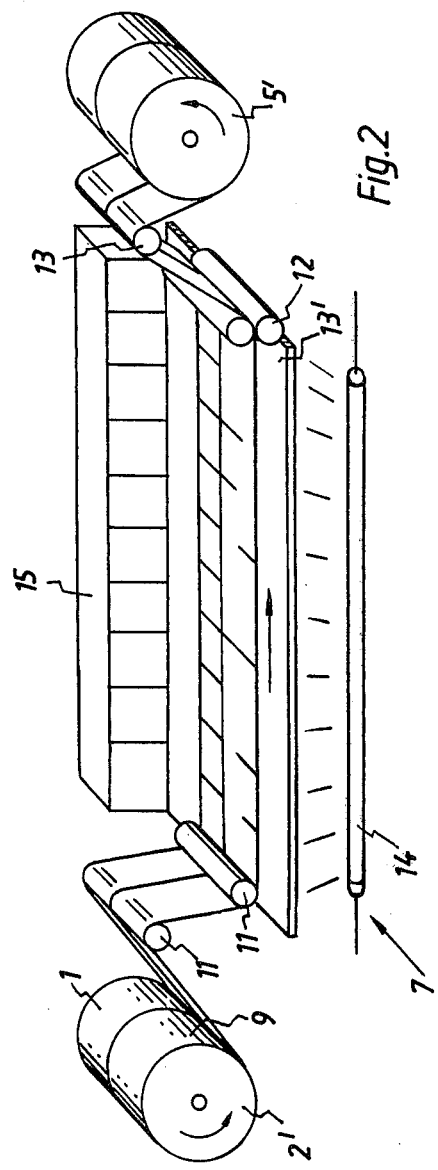

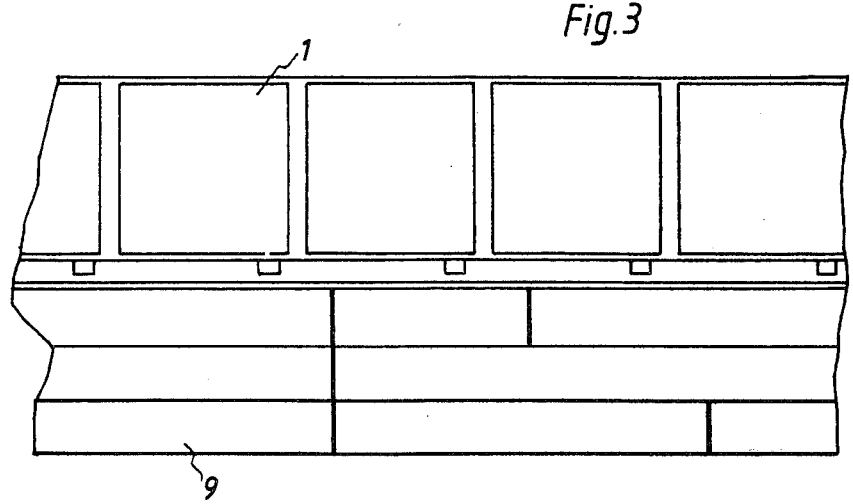
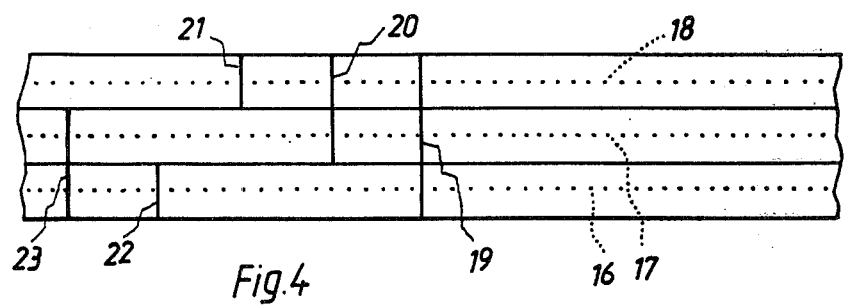

EVALUATION AND COPYING OF ORIGINALS ARRANGED IN A STRIP

BACKGROUND OF THE INVENTION

The invention relates to a method of evaluating and copying a strip of originals, of the type wherein, prior to the copying, the originals are evaluated with respect to density, color, copiability, or the like, with information derived from such evaluations being entered upon an information carrier. The invention also relates to an apparatus for performing this type of method.

In general, with this type of method, the negatives to be copied are evaluated with respect to their density and color deviations by automatic means, and are evaluated by a human operator with respect to copiability or printability. The human operator is furthermore in a position to perform a check over the automatically determined density and/or correction values. With simpler apparatus of the type in question, the human operator performs all the evaluations himself. The resulting exposure-correction values or determinations that certain originals are not copiable, for example because too unclear or not even exposed, are then usually fed into a storage device by means of a keyboard at the evaluating station. After the evaluation has been completed, the typed in evaluation information is transmitted to a suitable information carrier, for example a perforatable strip, a magnetic tape, or the like. This information carrier is thereupon processed in synchronism with the strip of originals in the copying station, in such a manner that the exposure-control means at the copying station can be made to process each original in correspondence to the information associated therewith on the information carrier. The requisite synchronization between the information carrier and the strip of originals can be achieved only by very expensive and complicated control arrangements. If such a control arrangement malfunctions, so that information regarding a particular negative is not properly entered on the information carrier, it may happen that the correlation between such information and the corresponding ones of the originals will be lost, i.e., a shift may develop as between the originals and the information associated with them. When this happens, several hundred negatives may become improperly or unnecessarily exposed.

SUMMARY OF THE INVENTION

It is a general object of the invention to provide a method of the type in question such as to provide, without any special synchronizing means, an absolutely reliable synchronization between the originals and the information carrier.

This object, and others which will become more understandable from the detailed description below, can be met according to one advantageous concept of the invention by transporting the strip of originals through an evaluation station prior to copying of the originals. At the evaluation station, the originals are evaluated with respect to density, color, copiability, or the like.

A discrete strip-shaped information carrier is attached to the strip of originals so as to run along the length of the strip of originals. This attachment is effected, at the latest, during the evaluation at the evaluation station. Information derived from the evaluations is entered upon the attached information carrier alongside the associated ones of the originals.

The invention also has for an object the provision of a simple and reliably operating apparatus for performing the type of method in question.

According to a broad concept of the invention, this apparatus comprises an evaluation station at which the originals are evaluated with respect to density, color, copiability, or the like, means transporting the strip of originals through the evaluation station along a predetermined path, and a strip-shaped information carrier onto which information representative of the results of the evaluations is enterable. Attaching means located no more downstream than the evaluation station is operative for attaching the information carrier to the strip of originals so that the former runs along the length of the latter attached thereto.

The invention accomplishes a reliable synchronization with the least possible expense. Complicated synchronizing means need no longer be provided at the printer and at the evaluation station. The information derived from the evaluations performed by the human operator, or by automatic means, is at all times readable by the human operator and therefore readily checked for accuracy. As one possibility for an encoding procedure, at least five distinguishable combinations of units of information can be entered on the information carrier, using only a single stroke for each combination; this is particularly important when the evaluations are all being performed by the human operator. In the case of multiple-print orders and reorders, the information entered on the information carrier can be utilized again, so that the otherwise necessary stamping of correction values can be dispensed with.

The inventive method is applicable to apparatuses for 110, 126 and 135 films, and also, in some circumstances, to roll film. The attaching of the strip-shaped information carrier to the strip of originals can be performed either at a specially provided cementing station upstream of the evaluation station, or else in the evaluation station itself if the latter is designed for this.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a schematic view of an apparatus for performing the inventive method;

FIG. 2 is a perspective view of another version of the apparatus shown in FIG. 1;

FIG. 3 shows the attachment of the strip-shaped information carrier to the strip of originals; and FIG. 4 illustrates an exemplary encoding procedure particularly suitable when the entry of coded information is to be performed manually.

DESCRIPTION OF THE PREFERRED EMBODIMENTS

According to the inventive method, a strip of originals to be copied has attached to it a strip-shaped information carrier made of paper, or the like. The attached information carrier runs along the length of the strip of originals, preferably cemented, glued or sealed thereto at an edge of the strip of originals provided with perforations. The attachment of the information carrier to the strip of originals is effected prior to performing the evaluations of such originals at the evaluation station. To this end, the strip of originals is pulled off a supply roll and fed into an attaching station. The strip-shaped information carrier is pulled off another supply roll and likewise fed into the attaching station, but in such a manner that a narrow strip of cement or adhesive on the information carrier overlies the edge of the strip of originals. By means of a suitable heated pressing instrumentality, the overlapping edge portions of the two strips are pressed together and sealed. A strip of originals provided in this way with an elongated information carrier can then be fed into the evaluation station, whereupon the human operator can enter upon the information carrier the requisite coded symbols representative of the evaluations. At the copying station, the film transport means is adjusted for a breadth corresponding to the attached-together strip of originals and elongated information carrier, and at the printing frame of the copying station there is provided sensing means for sensing the information entered on the information carrier and applying such information as control values to the exposure-control means of the copying station.

FIG. 1 depicts an apparatus for performing the inventive method. A strip of originals 1 is pulled off a supply roll 2 and transported via guide rollers 3 and 4 to a take-up roll 5. The strip of originals 1 is first transported through a cementing or attaching station 6, and then to an evaluation station 7. A supply roll 8 for a strip 9 is located near to the supply roll 2. The strip 9, which serves as the information carrier, is pulled off the supply roll 8 and transported over a guide roller 10 into the same plane as the strip of originals 1. The information carrier 9 travels within this plane, with its edge portion somewhat overlapping the neighboring edge portion of the strip of originals, and is fed along with the strip of originals 1 into the attaching station 6, where it is attached to the strip of originals 1 by an adhesive or the like. The information carrier 9 is transported, along with the strip of originals 1, into the evaluation station 7 and subsequently collected, along with the strip 1, on a take-up roll 5.

Thus, in the embodiment of FIG. 1 the strip 9 is attached to the strip 1 in the vicinity of the evaluation station. However, in general, different lengths of time are required for the evaluation at the evaluation station and for the completion of the attachment operation. Therefore, it is also advantageous to effect the attachment of the elongated information carrier to the strip of originals in a separate attaching apparatus independent of the evaluation station. However, depending upon the size of the evaluation station 7, it may also be advantageous to integrate the attachment location and the evaluation location, i.e., to feed the information carrier and the strip of originals, while still not attached to each other, into the evaluation station and then, while these two strips are at a standstill in the evaluation station, and during the actual evaluation operation, attach the one to the other using attaching means whose operation does not interfere with the performance of the requisite evaluations.

If the strip of originals and the information carrier are attached together at a separate attaching device, then the evaluation station can be of relatively simple design. FIG. 2 depicts such an embodiment. A strip of originals 1 and an elongated information carrier 9 already attached thereto are pulled off a supply roll 2' and transported via guide rollers 11 into an evaluation station 7, from where they are transported by means of a transport roller pair 12 and a guide roller 13 to a take-up roll 5'. The evaluation station 7 is essentially comprised of an elongated and transparent display plate 13, illuminated from below by a rod-shaped light source 14. One of the rollers 11 and the transport roller pair 12 are so arranged that the strip of originals with the information carrier 9 attached thereto are transported just above the upper surface of the display plate 13'. The length of the plate 13, and accordingly the length of the evaluation path, is in this embodiment selected to accommodate ten negatives.

If the evaluation station is provided with a (non-illustrated) automatic apparatus for determining density and/or color correction values, then there can be provided an elongated indicator panel 15 extending along the length of the evaluation path, the panel 15 being adapted to be connected to such automatic apparatus and being operative for displaying the automatically selected correction values alongside the associated ones of the individual negatives. The human operator can if he wishes check over these correction values, and possibly transfer them onto the strip-shaped information carrier 9. Irrespective of whether the density or color corrections are selected by the human operator or automatically, the human operator evaluates the individual negatives as to whether they should be considered printable at all.

FIG. 3 depicts a section of the strip of originals 1 and the corresponding section of the information carrier strip 9 attached thereto. The sealed-on strip 9 is in this case a paper strip subdivided by two longitudinally extending lines into three distinguishable tracks. Here, the simplest encoding expedient to use is a stroke code, according to which, for each negative requiring correction, the human operator need enter only a single stroke onto the associated section of the information carrier strip 9.

FIG. 4 depicts a proposed encoding expedient for, by way of example, five different possible corrections. The strip 9 is subdivided into tracks 16, 17 and 18. A stroke 19 extending across 11 three tracks signifies "exprint", i.e., that the negative in question should not be printed at all. A stroke 20 extending across the tracks 17 and 18 represents a requirement for an undercorrection. A stroke 21 in the track 18 can represent a correction for density "+4", a stroke 22 in track 16 a correction for density "+2", and a stroke 23 extending across tracks 16 and 17 a correction for density "−2".

Other encoding procedures besides the stroke code just described are advantageous, particularly when the information carrier is to be subdivided into a greater number of tracks or sections. Photocells provided at the copying station can be used for reading the dark strokes against the relatively translucent strip 9. In this connection, the exact locations of these strokes intermediate the ends of the associated negatives is not important; what is important is that such strokes are present or absent at all within the sections of strip 9 associated with the respective negatives.

Besides stroke codes which are to be used when information is manually entered upon the information carrier 9, virtually any other encoding procedure could be used. For example, the information carrier 9 could be encoded by means of a stamping device which stamps perforations into the strip 9. As another possibility, the strip 9, prior to being attached to the strip of originals 1, could be provided with a magnetic track, in which case the evaluation information would be entered on the strip 9 by magnetic means. In that event, more complicated codes could be employed.

Whether the encoding is effected manually or by machine means, it is possible to make quite accurate estimates of the time required for encoding and accordingly for the operating speed which the apparatus in question will be able to achieve during actual use. Experience has shown that on the average every fourth negative will require the entering of encoded evaluation information. This means that if a section of strip 1 containing twelve originals is present at the evaluating station, three strokes must be applied to the corresponding section of information carrier 9. If it is assumed that five seconds will be sufficient for the application of these three strokes, and if the strip transport time is assumed to be one second, then the production speed of the evaluating station will be about 7200 negatives per hour.

The attached-on strip 9 can be provided with additional empty fields for the entry, for example, of customer information, reorder information, or the like.

It will be understood that each of the elements described above, or two or more together, may also find a useful application in other types of constructions and procedures differing from the types described above.

While the invention has been illustrated and described as embodied in a method and apparatus for evaluating and processing a strip of negatives to be printed, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from a standpoint of prior art, fairly constitute essential characteristics of the generic or specific aspects of this invention.

What is claimed as new and desired to be protected by Letters Patent is set forth in the appended claims.

We claim:

1. In a method of processing a strip of originals to be copied, in combination, the steps of transporting the strip of originals prior to copying thereof through an evaluation station at which the originals are displayed for visual evaluation by a human operator, at the evaluation station visually evaluating the originals with respect to density, color, copiability, or the like, attaching to the strip of originals a discrete strip-shaped information carrier running along the length of the strip of originals and effecting the attachment latest during the evaluation at the evaluation station, and at the evaluation station entering information derived from the human operator's visual evaluations upon the information carrier alongside the associated ones of the originals.

2. The method defined in claim 1, the attaching of the strip-shaped information carrier to the strip of originals comprising cementing the former to the latter.

3. The method defined in claim 1, the entering of information upon the information carrier being effected manually using a writing implement.

4. The method defined in claim 1, the entering of information upon the information carrier comprising making perforations in the information carrier using an operator-activated automatic perforating device.

5. The method defined in claim 1, the entering of information upon the information carrier being effected by operator-activated magnetic recording means.

6. In an apparatus for processing a strip of originals to be copied, in combination, an evaluation station at which the originals are displayed for visual evaluation by a human operator with respect to density, color, copiability, or the like, a strip-shaped information carrier onto which information representative of the results of the human operator's visual evaluations is enterable, a strip supply unit for accommodating a strip of originals to be fed through the evaluation station, a carrier supply unit accommodating the strip-shaped information carrier; transporting means operative for continually pulling the strip of originals from the strip supply unit and the strip-shaped information carrier from the carrier supply unit and then continually transporting them jointly and side by side along a predetermined transport path extending through the evaluation station, the evaluation station including a light-transmissive display plate having a length sufficient for the simultaneous display of a plurality of originals and a light source for illuminating the plurality of originals on the display plate by means of light passing first through the display plate and then through the originals on the display plate, the display plate having a breadth sufficient for simultaneous viewing of both the strip of originals and the information carrier alongside the strip of originals, and attaching means located no more downstream than the evaluation station operative for attaching the information carrier to the strip of originals so that the strip of originals and the information carrier continually leave the evaluation station attached to each other.

7. The apparatus defined in claim 6, the strip-shaped information carrier being subdivided into visually distinguishable tracks.

8. The apparatus defined in claim 6, the strip-shaped information carrier being a perforatable strip.

9. The apparatus defined in claim 6, the strip-shaped information carrier being a magnetic tape.

10. The apparatus defined in claim 6, the strip-shaped information carrier being provided on its lower side with a narrow adhesive strip for sealing the information carrier to the strip of originals.

11. The apparatus defined in claim 6, the evaluation station further including an indicator panel running alongside the display plate for indicating alongside each displayed original at the evaluation station information indicative of density and/or color evaluations made by automatic evaluating means to which the indicator panel is adapted to be connected.

* * * * *